(12) United States Patent
Katz et al.

(10) Patent No.: US 8,665,374 B2
(45) Date of Patent: Mar. 4, 2014

(54) INTERACTIVE VIDEO INSERTIONS, AND APPLICATIONS THEREOF

(75) Inventors: Sheldon Katz, Ringoes, NJ (US); Gregory House, Doylestown, PA (US); Howard Kennedy, Hamilton Square, NJ (US); Joseph DiGiovanni, Voorhees, NJ (US); Smadar Gefen, Yardley, PA (US)

(73) Assignee: Disney Enterprises, Inc., Burbank, CA (US)

(*) Notice: Subject to any disclaimer, the term of this patent is extended or adjusted under 35 U.S.C. 154(b) by 771 days.

(21) Appl. No.: 12/541,037

(22) Filed: Aug. 13, 2009

(65) Prior Publication Data

US 2010/0050082 A1    Feb. 25, 2010

Related U.S. Application Data

(60) Provisional application No. 61/091,068, filed on Aug. 22, 2008.

(51) Int. Cl.
*H04N 7/10* (2006.01)

(52) U.S. Cl.
USPC ............................................ 348/589; 725/34

(58) Field of Classification Search
USPC ......... 348/584, 586, 588, 589, 596, 597–600, 348/563–569, 725; 725/34, 32, 35, 138, 725/136, 141; 382/305
See application file for complete search history.

(56) References Cited

U.S. PATENT DOCUMENTS

| | | | |
|---|---|---|---|
| 5,264,933 A | 11/1993 | Rosser | |
| 5,917,830 A | 6/1999 | Chen et al. | |
| 6,229,550 B1 * | 5/2001 | Gloudemans et al. | 345/641 |
| 6,317,885 B1 | 11/2001 | Fries | |
| 6,446,261 B1 * | 9/2002 | Rosser | 725/34 |
| 6,615,039 B1 | 9/2003 | Eldering | |
| 6,657,637 B1 * | 12/2003 | Inagaki et al. | 345/629 |
| 6,937,234 B1 * | 8/2005 | Long | 345/418 |
| 7,069,579 B2 | 6/2006 | Delpuch | |

(Continued)

FOREIGN PATENT DOCUMENTS

| EP | 1 173 979 B1 | 3/2003 |
|---|---|---|
| EP | 1 465 115 A2 | 10/2004 |

OTHER PUBLICATIONS

PCT, "Notification of Transmittal of the International Search Report and the Written Opinion of the International Searching Authority, or the Declaration," along with PCT International Search Report and PCT Written Opinion of the International Searching Authority; mailed Feb. 23, 2010, International Appln. No. PCT/US2009/054517, International Filing Date: Aug. 20, 2009, 20 pages.

(Continued)

*Primary Examiner* — Paulos M Natnael
(74) *Attorney, Agent, or Firm* — Fay Kaplun & Marcin, LLP (57) ABSTRACT

Embodiments of this invention relate to controlling insertion of visual elements integrated into video. In an embodiment, a method enables control of insertions in a video. In the embodiment, control data is received from a user input device. Movement of at least one point of interest in a video is analyzed to determine video metadata. Finally, a visual element is inserted into a video according to the control data, and the visual element changes or moves with the video as specified by the video metadata to appear integrated with the video.

31 Claims, 7 Drawing Sheets

(56) References Cited

U.S. PATENT DOCUMENTS

| | | | |
|---|---|---|---|
| 7,330,511 B2* | 2/2008 | Maltagliati et al. | 375/240.26 |
| 7,650,624 B2* | 1/2010 | Barsoum et al. | 725/138 |
| 7,929,808 B2* | 4/2011 | Seaman et al. | 382/305 |
| 7,944,506 B2* | 5/2011 | Jeon et al. | 348/564 |
| 7,952,747 B2* | 5/2011 | Toda | 358/1.18 |
| 8,176,509 B2* | 5/2012 | Folgner et al. | 725/22 |
| 2001/0027398 A1* | 10/2001 | Kohno | 704/275 |
| 2002/0097249 A1 | 7/2002 | Agarossi | |
| 2003/0025834 A1* | 2/2003 | Atkin et al. | 348/500 |
| 2003/0081145 A1* | 5/2003 | Seaman et al. | 348/460 |
| 2003/0189670 A1 | 10/2003 | Kennedy et al. | |
| 2003/0233379 A1* | 12/2003 | Cohen et al. | 707/200 |
| 2005/0055156 A1* | 3/2005 | Maltagliati et al. | 701/207 |
| 2009/0196512 A1* | 8/2009 | Shelton et al. | 382/229 |
| 2010/0141837 A1* | 6/2010 | Barsoum et al. | 348/500 |
| 2010/0228610 A1* | 9/2010 | Kaftan | 705/14.4 |

OTHER PUBLICATIONS

EP Patent Office, PCT—Invitation to Pay Additional Fees and, Where Applicable Protest Fee and Communication Relating to the Results of the Partial International Search; International Appln. No. PCT/US2009/054517, International Filing Date: Aug. 20, 2009; 7 pages.

CableLabs, OpenCable Guidelines: Cable Application User Experience Guidelines, Jun. 19, 2009, pp. i-iv and 1-25.

CableLabs, OpenCable Guidelines: UDCP Best Practices, Jan. 5, 2007, pp. i-vi and 1-18.

\* cited by examiner

INTERACTIVE VIDEO INSERTIONS, AND APPLICATIONS THEREOF

CROSS REFERENCE TO RELATED APPLICATIONS

This application claims the benefit of U.S. Provisional Appl. No. 61/091,068, filed Aug. 22, 2008, and incorporated by reference herein in its entirety.

BACKGROUND

1. Field of the Invention

The present invention is related generally to video processing, and specifically, to the insertion of visual elements into video.

2. Background Art

Television viewers and distributors are increasingly interested in receiving or sending on-board information with a standard video feed. To meet these needs, systems exist that insert visual elements, such as images, advertisements, text and video, into broadcast video such that the inserted visual elements appear integrated with the video. One such system is described in U.S. Pat. No. 5,264,933 to Rosser et al., incorporated by reference herein in its entirety. In an example, a graphic highlighting a hockey puck may be inserted into a hockey game video. While some viewers might appreciate the increased ease of following the puck, other viewers might prefer viewing unaltered video or viewing a different type of graphic highlighted puck.

Other systems exist that allow a user to enable display of certain types of visual elements within broadcast video, but the visual element may not appear integrated with the video. For example, picture-in-picture enables a user to insert a video from a first channel into a video from a second channel. However, the inserted video from the first channel generally appears at a fixed position and may not appear integrated with the video from the second channel.

Systems and methods are needed that enable a user to control insertion of visual elements that are integrated to appear part of the video.

BRIEF DESCRIPTION OF THE DRAWINGS/FIGURES

Embodiments of the invention are described with reference to the accompanying drawings.

In the drawings, like reference numbers may indicate identical or functionally similar elements.

DETAILED DESCRIPTION OF THE INVENTION

Embodiments of the present invention enable users to control and customize how visual elements are integrated with video. Visual elements may be inserted into a video such that the visual element tracks the physical location of a region at the videoed scene. In this way, the visual element appears to be part of the original video. According to an embodiment, a user can enable, disable, or modify the appearance of the display of the visual element. In other embodiments, a user can control where the visual element appears in the video or select what visual element is integrated with the video. In this way, embodiments enable users to control visual elements integrated into video.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Insertion Systems

Figure 1:
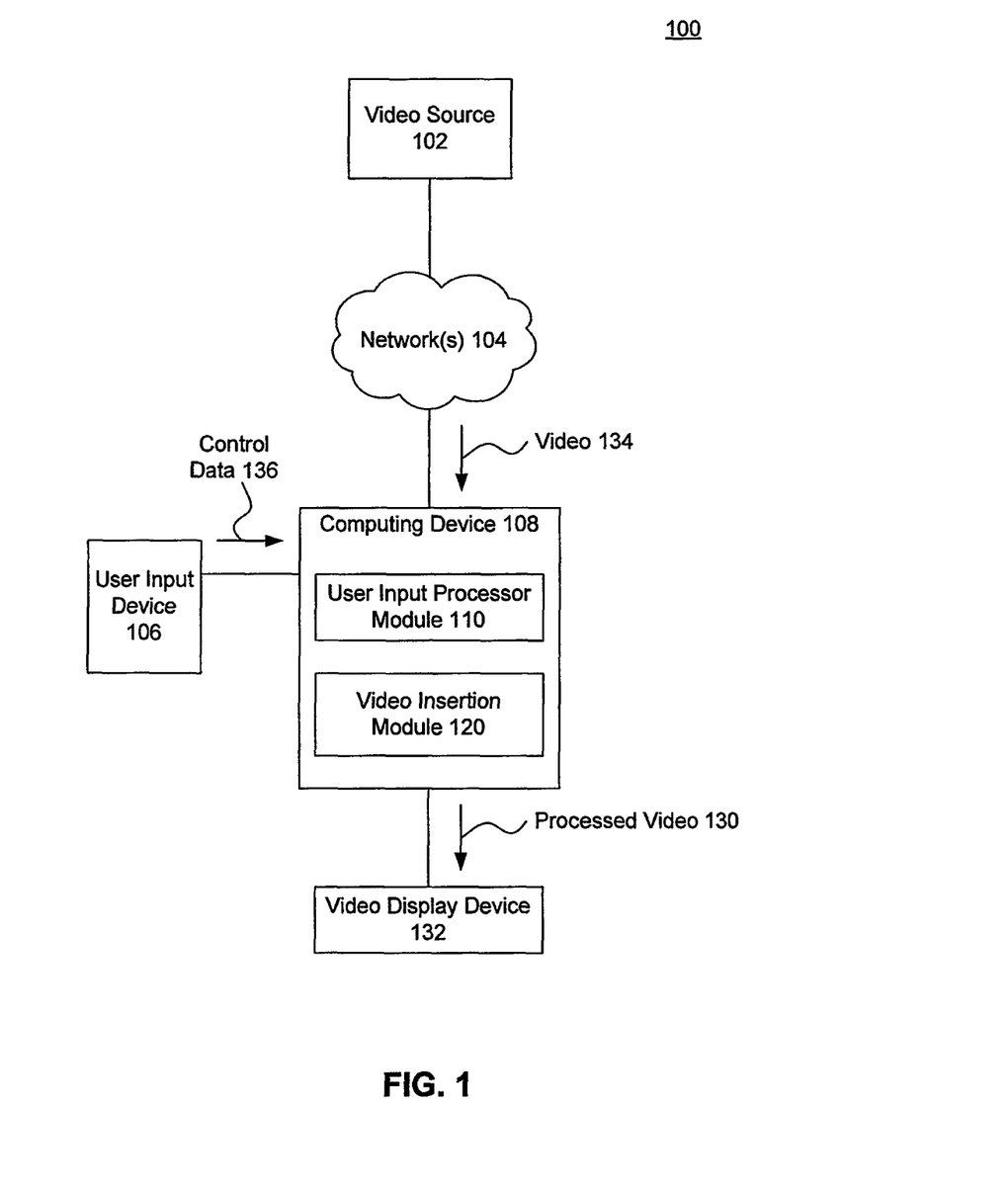
FIG. 1 is a diagram illustrating a system for controlling visual elements inserted in a video according to an embodiment of the present invention.

FIG. 1 is a diagram illustrating a system 100 for controlling insertion of visual elements into a video according to an embodiment of the present invention. System 100 includes a video source 102 coupled to a computing device 108 via one or more networks 104. Computing device 108 is coupled to a user input device 106 and a video display device 132. Computing device 108 includes a user input processor module 110 and a video insertion module 120.

Video source 102 is configured to provide video to computing device 108 via one or more networks 104. Video source 102 may be any type of video service provider. In examples, video source 102 may be a cable television service provider, a traditional broadcast service provider, an Internet protocol television (IPTV) service provider, an interactive virtual studio service provider, or a mobile phone video service provider. The video may be broadcast video or other types of videos. It may be part of a live presentation, such as of a sporting event, or it may be pre-recorded as a video file or files on a server or local recording device such as a digital video recorder (e.g., a TIVO recording device available from TiVo, Inc). In another example, video source 102 may be a video web service, such as the YOUTUBE™ service available from Google Inc. The video may comprise video produced by cameras, computer software, graphics generators, or other known methods.

User input device 106 is configured to enable a user to input control data 136. In examples, user input device 106 may be a remote control, mouse, keyboard, game consoles, cell phones, and other devices known to those of skill in the art. For example, user input device 106 may be a motion sensing device such as a gyroscopic mouse or a WII controller, available from Nintendo, Inc. User input device 106 may send control data 136 to computing device 108 using the Internet, Bluetooth, text messages over the cell phone network, or any other transmission mechanism as would be known to those of skill in the art. In other embodiments, multiple users may input control data 136.

In embodiments, a user may or may not be a viewer of the video. An example of the latter might be a parent controlling video their child may be watching. Users may be remotely located to computing device 108, such as an agent of a viewer controlling video from a remote location using the Internet. An example of the latter might be a remotely located coach controlling which player statistics viewers see as enhancements in a video of a sporting event. User input might comprise a plurality of inputs from viewers watching a sporting event and voting for an enhancement such as which player to highlight during a replay.

Computing device 108 may be any type of computing device including, but not limited to, a personal computer, mobile device such as a mobile phone, workstation, embedded system, game console, television, set-top box, or any other computing device. Further, a computing device can include, but is not limited to, a device having a processor and memory for executing and storing instructions. Computing device 108 may also have multiple processors and multiple shared or separate memory components. The computing device may be a clustered computing environment or server farm, in which, for example, the user input processor 110 and the video insertion model 120 reside at separate locations (either local or remote relative to the user). An example computing device is described in more detail with respect to FIG. 9.

Computing device 108 includes a user input processor module 110 and a video insertion module 120. User input processor module 110 is configured to receive control data 136 from a user input device. As described in more detail with respect to FIG. 2, user input processor module 110 may use the control data to enable video processing or to select a visual element to insert.

Video insertion module 120 is configured to insert a visual element into video 134 according to control data 136 to produce processed video 130. The inserted visual element may change or move to compensate for camera motion as well as to track moving points of interest in the camera view. A point of interest may be any pattern, object, or region within the content of a video. In examples, a point of interest may be in a video's foreground or background. Visual elements may be made to appear part of video 134 using techniques known in the art. For example, the visual element may track with the background video, be occluded by foreground objects, and blur similar to background video during fast pans. Video insertion module 120 may change the position or appearance of the visual element in real time as control data 136 changes. Once the visual element is inserted into processed video 130, video insertion module 120 may output processed video 130 to video display device 132.

The video insertion module 120 may both create a "dirty feed" by inserting a visual element into the video and maintain a "clean feed" by relaying video 134 without an insert. The clean feed video representing the original program and the dirty feed video, that may contain multiple visual elements sequentially inserted, may be provided to the viewer depending on the control data. The viewing device may provide the dirty feed to the viewer when a particular visual element is requested via user input or provide the clean feed to the viewer when a visual element is not requested through user input. Alternately, the clean feed and only the portion of the dirty feed differing from the clean feed (insertion region) may be sent to video display device 132 and the complete dirty feed may be reconstituted. It is possible to have multiple spatial portions of the dirty feed, each corresponding to a different visual element that may be individually enabled by the end-user using an input control device. For the case of pre-recorded programs on the web, mobile or cable platforms, both the clean and dirty feeds may be pre-recorded so control data 136 may select which feed is viewed on video display device 132.

Video display device 132 is configured to display processed video 130 to one or more viewers. In an embodiment, the viewer may be the same user that controls user input device 106. In this way, the viewer can interact with broadcast video, perhaps in real time. In examples, video display device 132 may be a computer monitor, television, projector, LCD screen, portable viewing device, cell phone, PDA, or other display device known to those of skill in the art. The video image may represent a portion of the video display, whereas the rest of the display may contain graphic representation of data or text.

The metadata, which may be computed in the video insertion model 120, contain data such as the camera model or point of interest position data, etc. These data may be presented to a viewer (metadata-presentation) by simply inserting a visual element at a position prescribed by the metadata (at a location relative to a player's head, for example), or it may be conveyed to the user in other ways (through a window-box at the bottom of the display listing a player's name being tracked, for example). The user, in turn, may choose to act upon the metadata-presentation through a user-initiated-interaction. User-initiated-interaction may be, for instance, selecting to annotate one or more players from a certain team.

The components of system 100 are described in greater detail below with respect to FIGS. 2-3.

Figure 2:
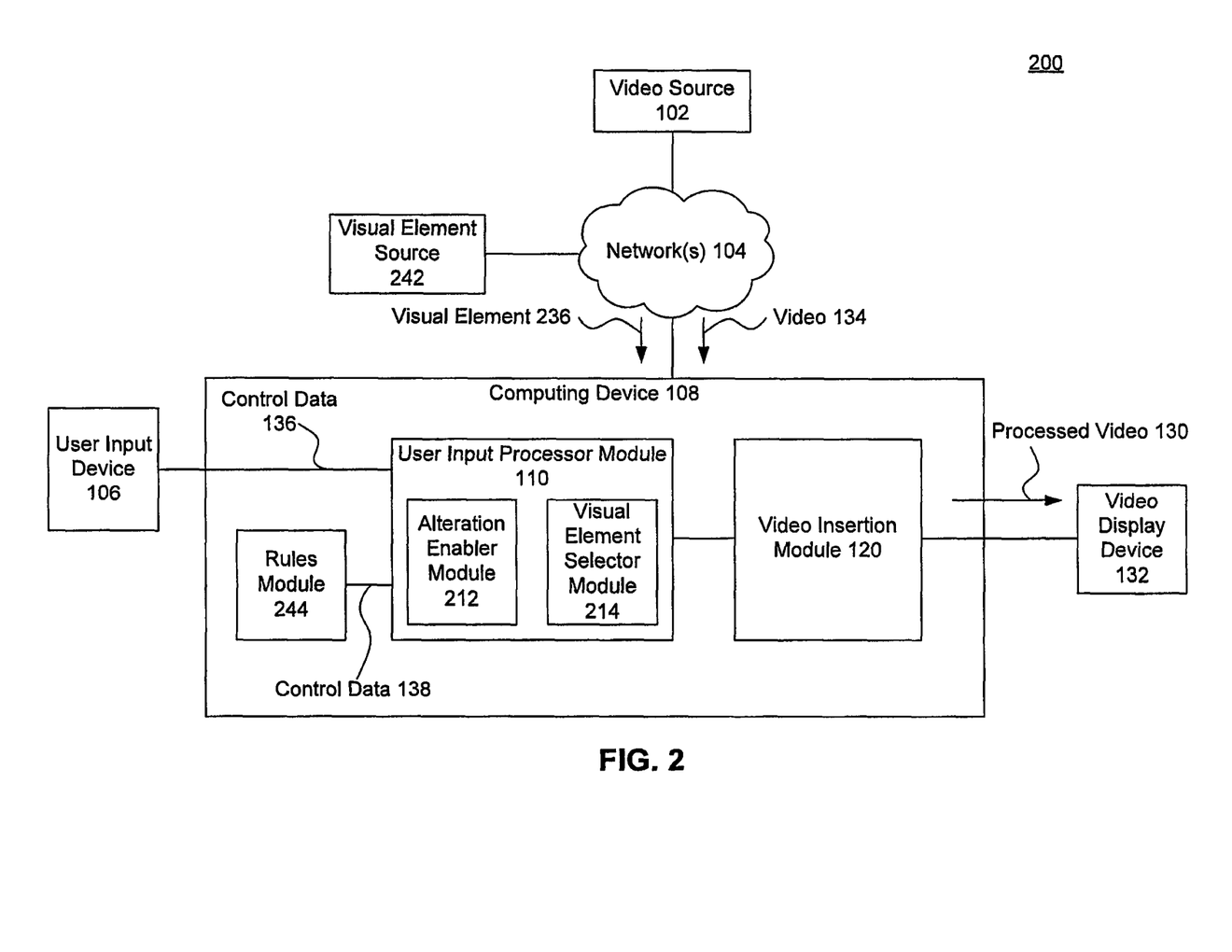
FIGS. 2-3 are diagrams illustrating the system in FIG. 1 in greater detail.
Figure 3:
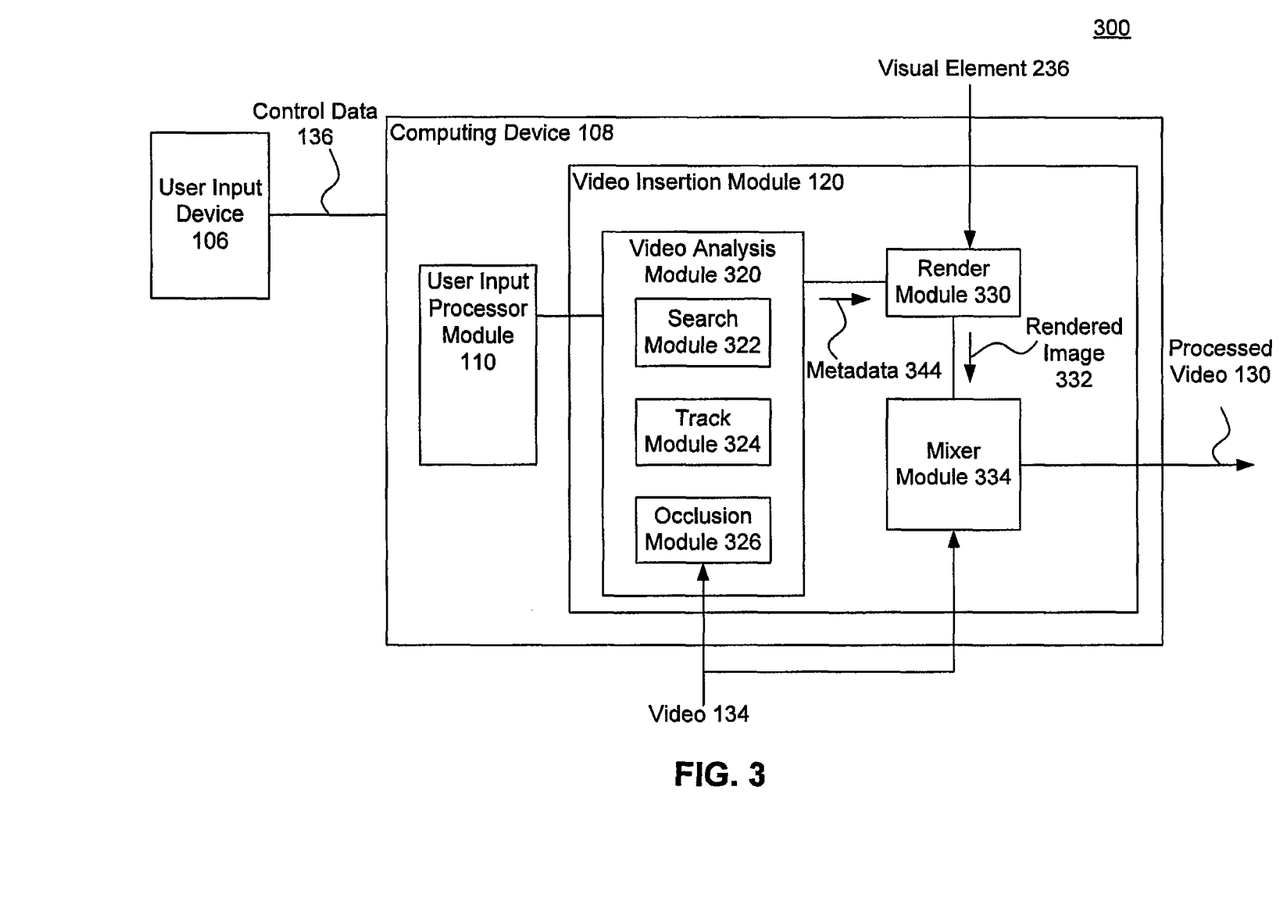

FIGS. 2-3 are diagrams illustrating a system 200 for controlling visual elements inserted in a video. As in system 100 in FIG. 1, system 200 includes video source 102, one or more networks 104, user input device 106, computing device 108, and video display device 132.

As in FIG. 1, computing device 108 includes user input processor module 110 and video insertion module 120. User input processor module 110 includes an alteration enabler module 212. Alteration enabler module 212 is configured to enable, disable, or modify insertions to the video according to control data 136. Alteration enabler module 212 may send a signal to video insertion module 120 to stop inserting visual elements into video 134. With insertions disabled, video display device 132 may display video 134 to a user. In an example, video 134 may be a video of a hockey game. In that example, the visual element may be a graphic representing a hockey puck. Inserting the graphic may make the fast-moving puck appear more distinct. While the graphic may be helpful to some viewers, other viewers may find the graphic to be distracting. Those users may input a control data 136 to disable insertion of the hockey path graphic. In response to control data 136, alteration enabler module 212 may send a signal to video insertion module 120 to disable insertion of the hockey puck graphic.

In addition to alteration enabler module 212, user input processor module 110 includes a visual element selector module 214. Visual element selector module 214 is configured to select a visual element to insert according to control data 136. In an embodiment, visual element selector module 214 may retrieve a visual element 236 from a visual element source 242 via one or more networks 104. In an example, visual element source 242 may be a web server, and alteration enabler module 212 may communicate with visual element source 242 using hypertext transfer protocol.

In an embodiment, user input processor module 110 may further enable viewers to select objects in video. For example, selecting an object in a video may cause the video to pause and display commercials relating to the object or may cause a price to be displayed on an object with a subsequent opportunity to purchase the object. Videos may be analyzed during post production processing using known manual, semi-automatic, or automatic methods to determine object locations. Methods such as match moving may be used to interpolate data between video frames. Location data may be stored in metadata files associated with the video. In embodiments, each frame may be correlated with its corresponding portion of metadata according to the frame number, the frame's timestamp, a checksum value, or closed caption text. Such metadata may enable multiple users to interact with objects at the same location such that different users see different insertions.

In examples, the visual element 236 inserted into video 134 may be an image, video, graphic, text, or advertisement (such as an advertising logo). Visual element 236 does not need to be in final rendered form. For example, it may be a scaled version of the final rendered form or it may be encoded into a known format and later be decoded into the final rendered form by the video insertion module 120. The latter method might be used to render text from a text string to reduce bandwidth requirements for visual element 236. Insertions may be derived from data sources such as channels broadcasting player statistics during a sporting event.

The visual element may track the background scene, such as a virtual first down line locked to a football playing surface. Otherwise, the visual element may track a point of interest, such as a ring positioned at player's feet during a sporting event. Part of a graphic may track a point of interest within the video, such as an arrow pointing to a player in a sporting event where only the point of the arrow tracks the point of interest location. Graphic insertion may be relative to both the background scene and the foreground point of interest, for example, when the graphic marks the trail (path) of a moving player in a broadcast video. In this case, trail points—feet position through time—are first initialized based on point of interest tracking and then updated to compensate for camera motion.

In one advantage of inserting advertisements, viewers may prefer to have advertisements integrated into the video over having video programs interrupted for advertisements. In other examples, the visual elements may include stock quotes or weather forecasts, sports match scores, text messages, caller ID messages, electronic mail, alerts, announcements, news, weather, or programming information. Further, the visual element may provide information relating to a sports match such as a virtual first down line in a football game or a graphic representing a hockey puck. The visual element may be created from a two-dimensional image or from a three-dimensional object. For example, the visual element may a realistically rendered golf club generated from a three-dimensional model of a golf club. The visual element may be adjusted for changing light levels in the scene, may include a shadow cast by the golf club in the scene, etc. using known compositing methods. By controlling the golf club model, a viewer may interact with a televised golf tournament. In another embodiment, the visual element may be a graphical image overlaying the playing surface representing statistical performance information. For example, it may be a kick graph illustrating the success rate of a NFL kicker at various distances from the goal post. Alternately, it may be a graphic form from a player tracking system, such as a heat map illustrating one or more players over time. Other examples of generating visual elements related to player tracking are described in U.S. patent application Ser. No. 12/490,026 by House et al., incorporated by reference herein in its entirety.

The visual element may be formulated from visual data received from a source via a communication channel. The data source may be electronically received from multiple locations, including but not limited to: the on-site production, in-studio production, and official league data centers. Visual data may be an image, video, graphic, text, or advertisement. Visual data may include statistical information related to a sporting event being viewed, both from official sources (down and distance, balls and strikes, time left in the period, etc.) and those derived from object tracking sources (speed of a pitch, speed of a puck, player distance covered, etc.) Visual data may include information derived from video source 102, such as speed of a point of interest. It may be character information extracted from broadcast overlay graphics in a downstream broadcast feed. Visual data may comprise location information, such as the appropriate yard line for displaying the first down line or line of scrimmage. It may contain positional information regarding the location and orientation of players in a sporting event that may have been generated on-site using a sensor system, as, for example, described in U.S. patent application Ser. No. 12/403,857, incorporated by reference herein in its entirety. Visual data may contain three-dimensional representation modeling information about an animated object, and texture or image information used to render the animated object. Known methods to render three-dimensional animated objects may be used, such as skeletal animation where simplified models comprising bones of a skeleton are covered with layers of skins comprised of mesh triangles and textures. The visual data may be an image or graphic, generated from a graphics engine in real-time or created prior to the video presentation that it is displayed in.

The visual element embedded with the video may be accompanied by a visual presentation, external to the visual element, which corresponds to the visual element embedded in the video. The visual presentation can include raw data, text or numbers that may be rendered for display. The visual presentation may be a static or dynamic graphic that may contain text or other visual information overlaying the video, or displayed outside the portion of the display containing the video. This may be implemented for television, mobile and web applications. For example, the user may be able to select a player name from a drop down list in the web page or interactive cable menu, and a highlight would appear in the video possibly accompanied by a local display with the player's head shot and relevant performance statistics. Alternately, graphically elements can be embedded in the video around each player of a team, and selecting the visual element around a particular player would trigger the presentation of a head-shot image and relevant player information in the webpage or a video display, where the original video is scaled to a corner of the video display.

In an embodiment, computing device 108 may include a rules module 244. Rules module 244 is configured to enable a video service provider to define at least one rule to generate control data 138 based on viewer data. Rules may operate on viewer data in real time, such as during real time user interactivity, or they may use viewer data previously stored, such as previously entered user viewing preferences. In examples, viewer data may include viewer location, time, preferences, surveys, or past inputs (such as a request to fast forward through a portion of video). Using the viewer data, rules module 244 may apply rules to determine control data 138 which may instruct user input processor module 110 to enable or disable insertions or to select a visual element to insert. In one example, a viewer action, such as fast-forwarding through a commercial may cause rules module 244 to send control data 138 to enable insertion of an advertising logo associated with that commercial into the video. In this way, a video service provider may ensure product exposure while allowing a viewer to fast-forward through commercials. In another example, rules module 244 may use viewer data to customize advertisements inserted into video. In this way, a video service provider may more precisely target ads to particular audience members. In some embodiments, personal data or anonymous data may be used to determine insertions, such as whether a viewer using cable television has a DVR installed. In embodiments particular suitable for web applications, video elements may be selected or determined based on criteria such as browsing history, cookies, IP addresses, network connection speed, codec type, etc. Visual elements may be retrieved from an ad serving networks such as a DOUBLECLICK service, available from Google Inc.

Once user input processor module 110 processes control data 136 or 138, video insertion module 120 inserts a visual element into video 134 to create processed video 130. In an embodiment, video insertion module 120 may insert the visual element into relatively non-critical areas of scenes such as unused areas of playing surfaces in sporting events. In another embodiment, a user can affect where user input module 110 inserts the visual element. Operation of video insertion module 120 is described in more detail with respect to FIG. 3.

FIG. 3 is a diagram illustrating a system 300 for controlling visual elements in a video. As in FIGS. 1 and 2, system 300 includes user input device 106 and computing device 108. Computing device 108 includes user input processor module 110 and video insertion module 120.

User input processor module 110 receives control data 136 from user input device 106. User input processor module 110 may complete further processing as described with respect to FIG. 2. Video insertion module 120 is configured to integrate video 134 with visual element 236 to produce processed video 130.

Video insertion module 120 includes a video analysis module 320, a render module 330, and a mixer module 334. In general, video insertion module 120 is configured to operate as follows. Video analysis module 320 receives video 134 and analyzes movement of points of interest within video 134. Points of interest may comprise foreground or background objects, texture blocks, or derived information from video used in known video search and track methods. Video analysis module 320 sends metadata 344 describing movement within video 134 to render module 330. Render module 330 uses metadata 344 to create a rendered image 332 based on visual element 236. Finally, mixer module 334 inserts or mixes the rendered image 332 into video 134 to create processed video 130. Each of the components is described in greater detail below with respect to illustrative embodiments.

Video analysis module 320 includes a search module 322, a track module 324, and an occlusion module 326. In an embodiment, video analysis module 320 may be located on a separate computing device from mixer module 334 (and possibly render module 330) as described in U.S. patent application Ser. No. 12/424,056 by Kennedy. Video analysis module 320 may require more computing resources than mixer module 334. In an illustrative example, to execute in real-time, video analysis module 320 may require a high-performance computer, such as a back end server. By having video analysis module 320 on a separate computing device from mixer module 334, the visual element may be inserted on a computing device with fewer computing resources, such as a mobile device, set top box, or personal computer.

In a further embodiment, video analysis module 320 may receive camera view data (not shown) that define movements of a camera as described in U.S. Pat. No. 6,455,275 to Honey et al. Using camera view data, video analysis module 320 may generate video metadata more accurately.

Search module 322 may be configured to analyze video 134 and to determine camera models and scene geometry for video scenes. For example, search module 322 may be configured to scan repeatedly the video to develop a three-dimensional model of the video using, for example, structure-from-motion techniques. Using its sub-modules, video analysis module 320 is configured to produce metadata 344 that describes how to insert a visual element. The search module 322 may be configured to detect foreground points of interest on the playing surface. For example, it may apply a chroma-keying approach to find the probable location of athletes participating in a sporting event, as described in U.S. patent application Ser. No. 12/490,026.

Track module 324 may be configured to track points of interest within the video. One example operation is described in U.S. Pat. No. 6,741,725 to Astle. Texture blocks in the video may be used to derive a camera model for the scene. Alternately, a user may select a particular point of interest in the video. Track module 324 may recognize how the point of interest moves and changes appearance during the video. As compared with the three-dimensional model determined by search module 322, track module 324 may determine a position and geometry (e.g., size and shape) of a point of interest in each frame of the video. Track module 324 may have reduced processing requirements relative to search module 322. Further, track module 324 may more accurately track a specific point of interest in the video when compared to search module 322.

In other embodiments, search module 322 and track module 324 may be combined as a single module. A search method may be used in each frame to track points of interest within the video and to derive camera models for each frame. Such methods may implement a smoothing algorithm to provide smoother rendering of insertions in the video. Tracking modules may also employ smoothing and other methods to compensate for inaccuracies in generating insertions. Although both search module 322 and track module 324 may generate camera models and point of interest locations, the search module may work from largely unknown scenes while the track module may work for largely known scenes. Using known information may enable better performance and more efficient processing from scene to scene.

In an exemplary embodiment, the computing device 108 resides in a platform local relative to the user, such as in a set-top box. Tracking of points of interest may be carried out with or without deriving the camera model. Metadata to facilitate insertion may be generated locally and possibly be triggered by user interaction. In this setting, a point of interest may be initially selected by the user and then tracked by the tracker 324 to facilitate insertion.

Occlusion module 326 is configured to determine when foreground objects should occlude visual elements. In one embodiment, metadata 344 may define a shape defining any foreground objects in each frame of the video. In a second embodiment, metadata 344 may define what color the target is in each frame. In a third embodiment, metadata 344 may include a mask that defines whether the target is in the foreground or background on a pixel-by-pixel basis, similar to an alpha channel.

Render module 330 is configured to create rendered image 332 based on visual element 236 and metadata 344. In embodiments, metadata 344 may include camera models and point of interest locations determined by search module 322, camera models and insertion locations and geometry determined by track module 324, occlusion information determined by occlusion module 326, or any combination thereof. In examples, to describe the insert and point of interest locations, metadata 344 may include a screen location, physical three-dimensional location, reference location on a plane in the scene, or other data representation such as presented U.S. patent application Ser. No. 61/083,049. A camera model may be required to generate a physical three-dimensional location or reference location on a plane in the scene.

In a first embodiment, render module 330 may render visual element 236 according to a camera model determined by search module 322. In an example, the visual element may be a three-dimensional object, and render module 330 may render the three-dimensional object to appear within the video. In that example, render module 330 may render a three dimensional animated figures using three-dimensional modeling techniques, including, for example, texture loading, virtual camera modeling and rendering to a view port. Three dimensional rendering techniques are widely used in gaming applications. In another example, render module 330 may blur visual element 236 according to motion of the camera with respect to background points of interest in the video. In a second embodiment, render module 330 may change the size and shape of visual element 236 according to the geometry of a point of interest in the video determined by track module 324. Once render module 330 has altered visual element 236 according to the camera model data or the point of interest geometry data, render module 330 may obscure or remove a portion of the visual element 236 according to points of interest in the foreground of the video to create rendered image 332. In this way, rendered image 332 may appear to be occluded by foreground points of interest when inserted into video 134. Render module 330 may also render a graphic for mixing with background video, such as for highlighting a player in a sporting event.

Mixer module 334 mixes rendered image 332 with video 134 to produce processed video 130. In each frame of the video, render module 330 inserts the rendered image 332 at the location defined by metadata 344. For web applications, the rendered output may be displayed as a graphical overlay to the video window. This allows the system to leverage dedicated video compression and rendering hardware to generate the video image.

In an embodiment, system 300 may have multiple render modules 330 and multiple mixer modules 334 running, for example, on separate processors. For example, each viewer may have a corresponding render module and mixer module. In this way, a single computing device 108 can insert different visual elements controlled by different viewers.

In an example operation of system 300, a viewer watching a golf match and using a Wii Remote, gyroscopic mouse, or other motion sensing device may interact with the video. The viewer might swing a virtual golf club to actively participate in the game they are viewing. A viewer might see an indicator while a player is swinging their club prompting the viewer to swing their virtual club. The video might respond showing a trajectory of a virtual golf ball, giving the viewer a sense of participating in the game. For fantasy gaming applications, a viewer might compete against other viewers. In this way, embodiments enable gaming applications for other sports whereby viewers can play within broadcast video. Embodiments may have further applications including sales, marketing, educational, instructional, training, medical, accessibility, entertainment, and simulation.

In an embodiment, video 134, processed video 130, or both may be formatted as compressed video. The video may be decompressed for processing. However, decompressing and compressing the video may degrade the video content. Alternatively, video insertion module 120 may be configured to process the compressed video directly. This embodiment may be useful in cable television headend video transport streams where video is often transported in a compressed format. Working directly with compressed video might help maintain higher quality transport video.

In another embodiment, video 134 and processed video 130 may be formatted to present viewers with three-dimensional video. Known methods may be used to render three-dimensional objects within three-dimensional video. As an example, some three-dimensional telecasts use stereoscopy to give viewers a sensation of watching three-dimensional video. Separate channels may be transmitted to a three-dimensional viewing device for left and right eye images. In some cases, left and right eye video may be selectively presented to viewer left and right eyes using special three-dimensional glasses. Video signals comprising separate left and right channels may give viewers a three-dimensional viewing perspective using stereoscopy. A second video insertion module 120 may be added to enable producing left and right eye insertion video. Separate left and right modules may generate separate camera models for left and right eye insertions, taking into account separate viewpoints for viewer left and right eye perspectives.

Each of user input processor module 110, video insertion module 120, rules module 244, alteration enabler module 212, visual element selector module 214, video analysis module 320, search module 322, track module 324, occlusion module 326, render module 330, and mixer module 334 may be implemented in hardware, software, firmware or any combination thereof Implementation may be distributed to multiple physical devices and locations.

Video Distribution System

Figure 4:
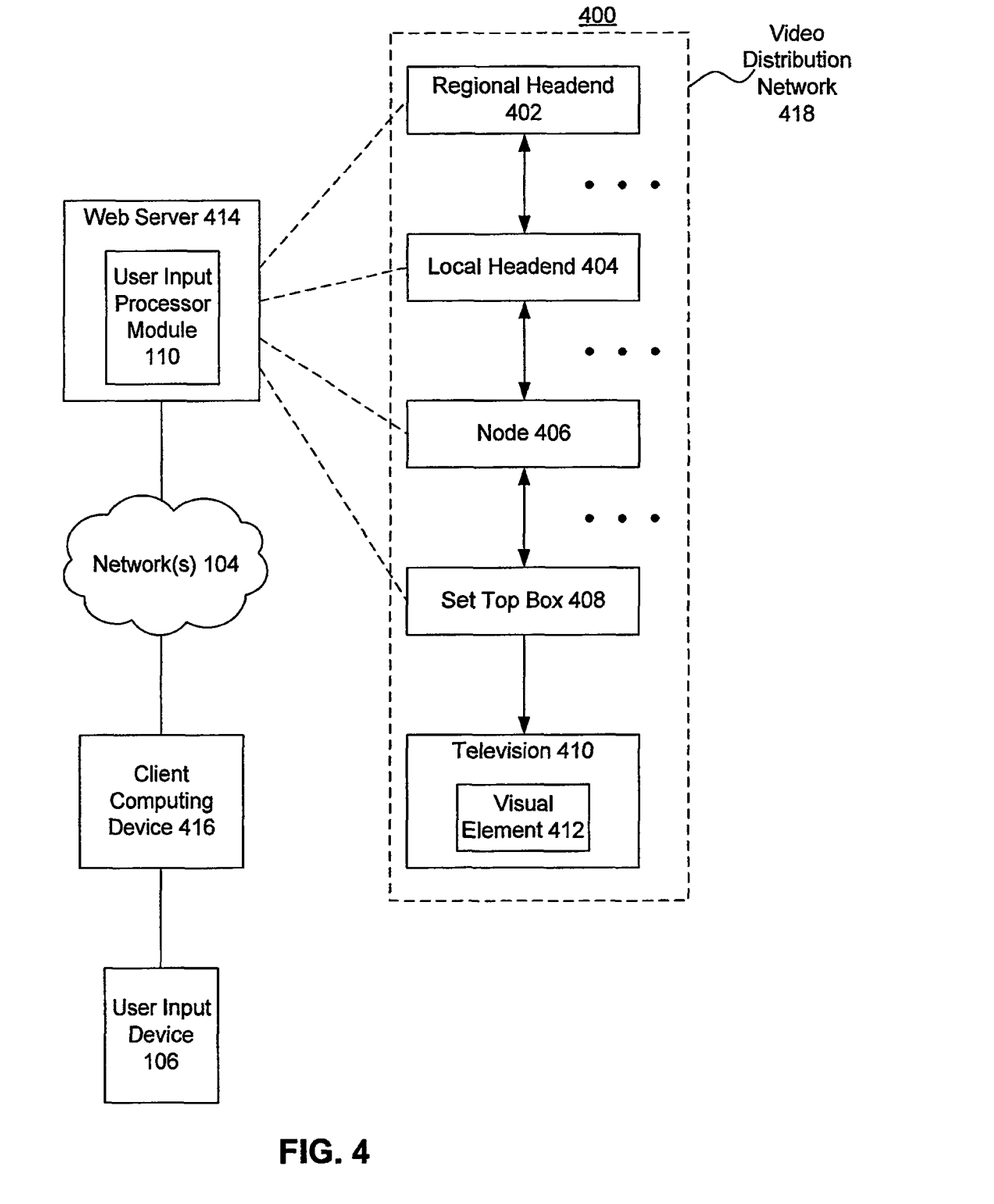
FIG. 4 is a diagram illustrating a video distribution system according to an embodiment of the present invention.

FIG. 4 is a diagram illustrating a video distribution system 400 according to an embodiment of the present invention. System 400 illustrates a client computing device 416 and user input device 106 coupled to a web server 414 via one more networks 104. Web server 414 includes a user input processor module 110 and is coupled to a component of a video distribution network 418.

Video distribution network 418 is configured to distribute broadcast video. In an embodiment, video distribution network 418 may be a cable television distribution network and may include a regional headend 402, local headend 404, node 406, and set top box 408. Video may be transmitted from regional headend 402, to local headend 404, to node 406 and finally to set top box 408. Video distribution network 418 may be structured as a tree where each component delivers video to a successively smaller geographic area. For example, regional headend 402 may deliver video to an entire state; local headend 404 may deliver video to a metropolitan region; node 406 may deliver video to a neighborhood; and set top box 408 may deliver video to a television 410. In an embodiment, at least one of the components of video distribution network 418 inserts a visual element 412 into a broadcast video.

Different televisions may receive video with inserted visual element 412 depending on where visual element 412 is inserted in video distribution network 418. If visual element 412 is inserted at regional headend 402, visual element 412 may be inserted into video delivered to an entire state. If visual element 412 is inserted at local headend 404, visual element 412 may be inserted into video delivered to a metropolitan region. If visual element 412 is inserted at node 406, visual element 412 may be inserted into video delivered to a neighborhood. Finally, if visual element 412 is inserted at set top box 408, visual element 412 may be inserted into video delivered to a particular television 410.

Web server 414 is coupled to at least one component of video distribution network 418. Web server 414 includes user input processor module 110. Web server 414 responds to a hypertext transfer protocol (HTTP) request with an HTTP reply. As illustrative examples, the web server may be, without limitation, Apache HTTP Server, Apache Tomcat, MICROSOFT Internet Information Server, JBoss Application Server, WEBLOGIC Application Server, or SUN Java System Web Server. The web server may serve content such as hypertext markup language (HTML), extendable markup language (XML), documents, videos, images, multimedia features, or any combination thereof.

Client computing device 416 may be any type of computing device as described above. An example computing device is described below with respect to FIG. 7. In an example, client computing device 416 may include a web browser to communicate with web server 414.

In an example operation, a user may enter an input using user input device 106. For example, a user may use a mouse or keyboard to enter data into a form presented using the web browser on web server 414. For example, a user may enter data to indicate whether to enable insertion of a visual element such as an advertisement. Client computing device 416 sends control data to web server 414 via one or more networks 104. On web server 414, user input processor module 110 receives the control data and sends a signal to one of the components of video distribution network 418 to enable or disable insertions. In this way, a user can control insertion of visual elements in video.

System 400 may also enable a user to control the insertion of visual elements by enabling a user to select a visual element to insert or enabling a user to control how and where the visual element is inserted as discussed in examples provided with FIGS. 1-3.

Implementation

Figure 5:
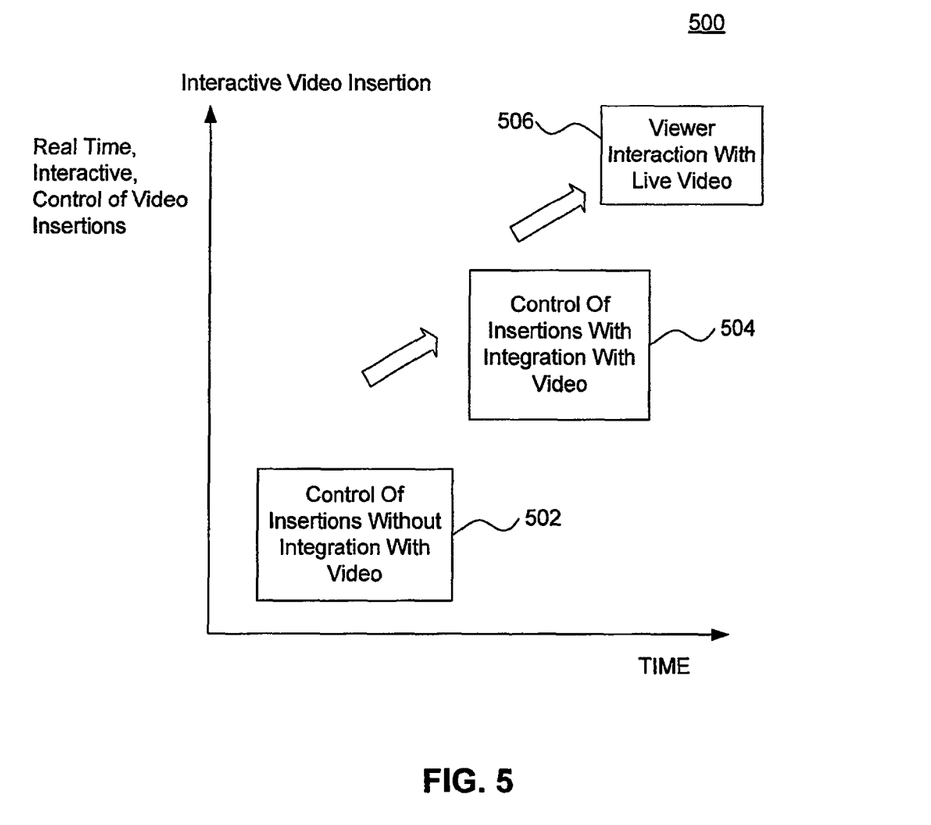
FIG. 5 is a diagram illustrating example processing times of different embodiments of the present invention.

FIG. 5 is a diagram illustrating an example implementation strategy to upgrade a system for different embodiments of the present invention over time. With increasing levels of control, the system resources and complexity required to process the video may increase.

As illustrated in FIG. 5, systems 502 enable inserted visual elements into broadcast video but the visual elements might not appear to be part of the original video and real to viewers. Systems 502 may require the least amount of computing resources, such as memory and processor clock cycles. Systems 504 enable a user to add a visual element that appears integrated with original video. Systems 504 may require more computing resources than systems 502. Finally, systems 506 systems change the position or rendering of the visual element according to viewer actions in real time. For example, a user may use a Wii Remote to shoot a basketball during a broadcasted basketball game. Systems 506 may require more computing resources than systems 504 and 502.

Method

Figure 6:
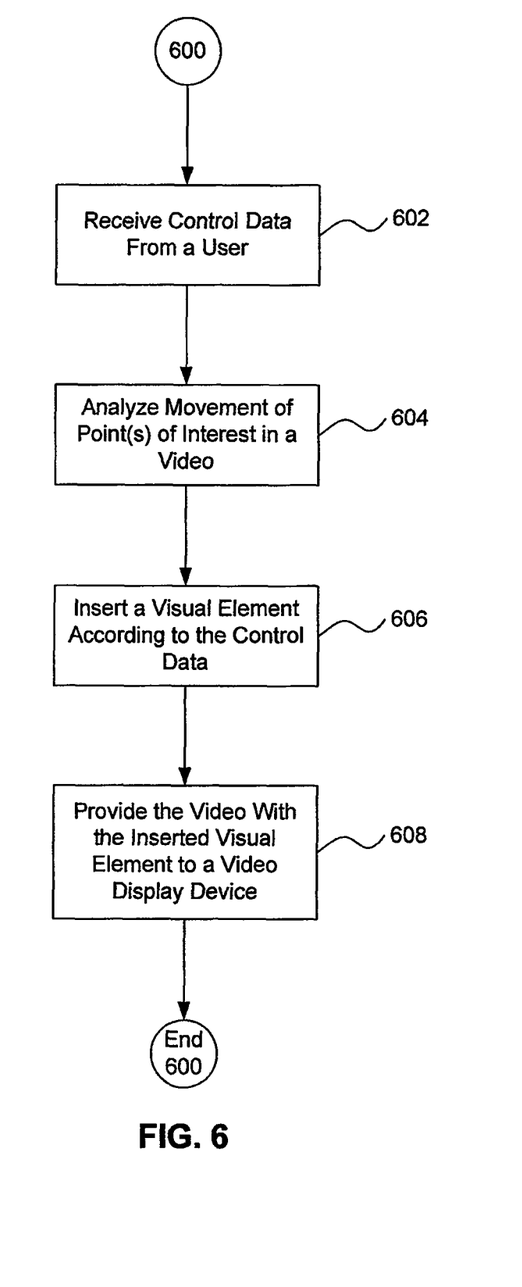
FIG. 6 is a flowchart illustrating a method for controlling visual elements inserted in a video to an embodiment of the present invention.

FIG. 6 is a flowchart 600 illustrating a method for controlling insertion of visual elements in a video according to an embodiment of the present invention.

Flowchart 600 begins at step 602 when control data from a user input device is received. As described above, a user input device for example may be a remote control, mouse, keyboard, game console, cell phone, and other device known to those of skill in the art. In an embodiment, the control data may specify an object in the video that the user would like a visual element to track. In another example, the control data may select a visual element to insert into the video. In that embodiment, the visual element may be retrieved, for example, from a web site. In a further embodiment, the control data may affect where a visual element may be inserted into the video, like the position of a golf club inserted into a golf tournament. In yet another embodiment, the control data may be used to determine the pose and motion of an animated figure representing a golfer.

At step 604, movement of at least one point of interest in a video is analyzed to determine video metadata. The metadata describes how the visual element may be inserted into a video. In an example, an object specified by the control data may be tracked in the video.

In an embodiment, the video may be analyzed as described above with respect to search module 322 in FIG. 3. Camera models and scene geometry for video scenes may be determined. For example, the video may be repeatedly scanned to develop a three-dimensional model of the video using, for example, structure-from-motion techniques.

In an alternative embodiment, the video may be analyzed as described above with respect to track module 324 in FIG. 3. One or more points of interest in the video may be tracked.

At step 606, a visual element is inserted as specified at least in part by the control data. The visual element may change or move with the video as specified by the video metadata to appear integrated with the video. In an example, the visual element may be inserted at the position of the tracked object. In another example, the visual element may be inserted according to a camera model. The visual element may also be rendered to appear integrated with the video. For example, portions of the visual element may be removed to appear occluded by foreground objects or the visual element may be blurred according to motion of the camera.

As discussed above with respect to FIGS. 2-3, in an embodiment, the visual element may be inserted into the video only when specified by the control data. In another embodiment, the visual element may be selected according to the control data. For example, the control data may indicate to retrieve a particular visual element from, for example, a web site. In a third embodiment, the visual element may be inserted at a position in the video according to the control data.

At step 608, the video with the inserted visual element is provided to a video display device for display to the user. In this way, a user may control whether and how the visual element is integrated in the displayed video.

In an embodiment, steps 604 and 606 may occur on at different places in a video distribution network, such as video distribution network 418 in FIG. 4. As described above, the video distribution network may be a cable television distribution network and may include a regional headend, local headend, node, and set top box. Video may be transmitted from the regional headend, to the local headend, to the node and finally to the set top box. The video distribution network may be structured as a tree where each component delivers video to a successively smaller geographic area. For example, the regional headend may deliver video to an entire state; the local headend may deliver video to a metropolitan region; the node may deliver video to a neighborhood; and the set top box may deliver video to the television.

As described above, depending on the position in the video distribution network (e.g., the local headend, regional headend or node), the visual elements may be inserted into video distributed to different households or televisions at different geographic locations. For example, if the visual element is inserted at a regional headend, the visual element may be inserted into video delivered to an entire state. If the visual element is inserted at a local headend, the visual element may be inserted into video delivered to a metropolitan region. If the visual element is inserted at a node, visual element may be inserted into video delivered to a neighborhood. Finally, if the visual element is inserted at a set top box, the visual element may be inserted into video delivered to a particular television.

Example Computing Device

Figure 7:
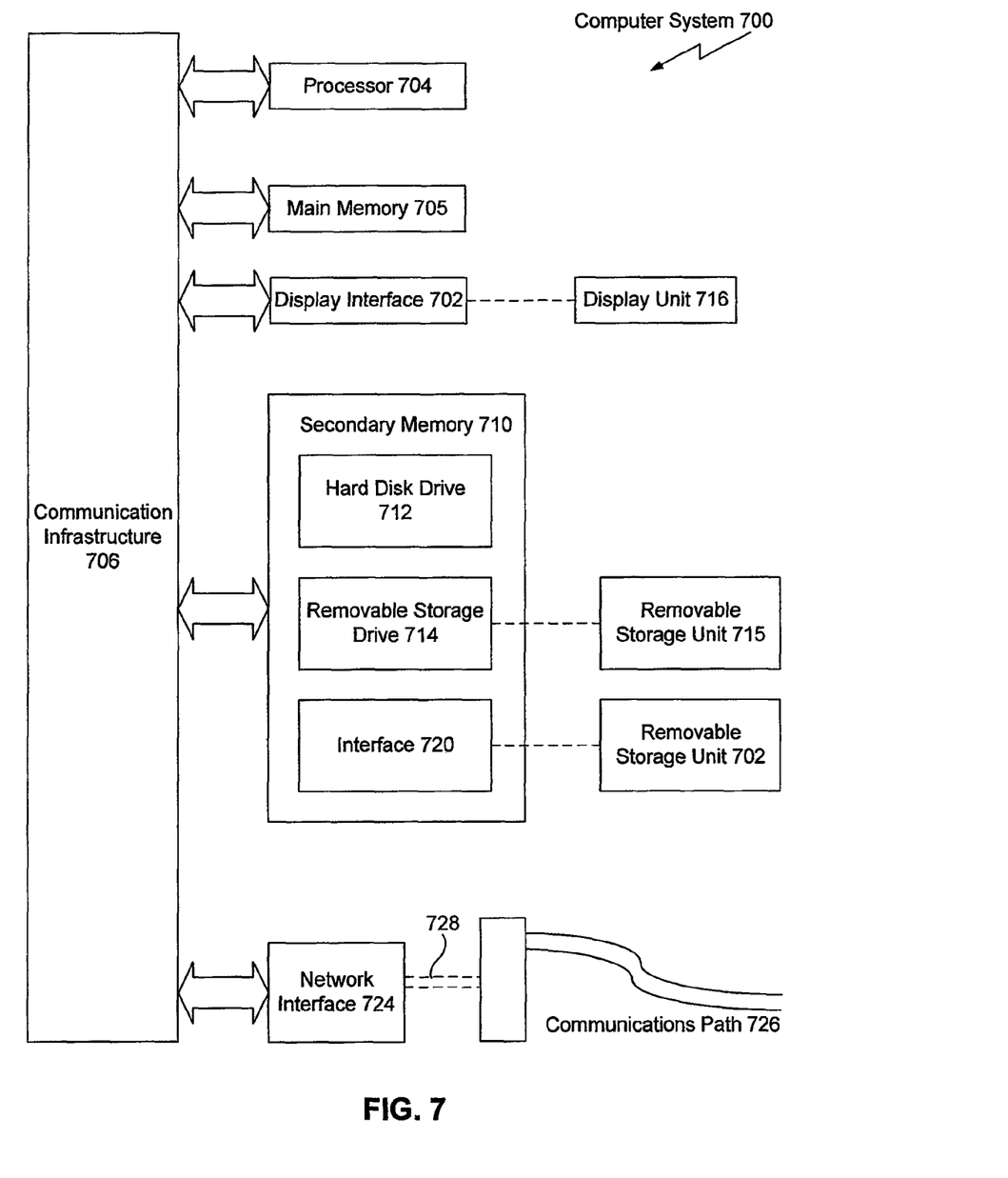
FIG. 7 is a diagram illustrating an example computing device which may be used in embodiments of this invention.

FIG. 7 is a diagram illustrating an example computing device which may be used in embodiments of this invention. The computing device 700 includes one or more processors, such as processor 704. The processor 704 is connected to a communication infrastructure 706 (e.g., a communications bus, cross over bar, or network). Various software embodiments are described in terms of this exemplary computing device. After reading this description, it will become apparent to a person skilled in the relevant art(s) how to implement the invention using other computing devices and/or architectures.

Computing device 700 can include a display interface 702 that forwards graphics, text, and other data from the communication infrastructure 706 (or from a frame buffer not shown) for display on the display unit 730.

Computing device 700 also includes a main memory 708, preferably random access memory (RAM), and may also include a secondary memory 710. The secondary memory 710 may include, for example, a hard disk drive 712 and/or a removable storage drive 714, representing an optical disk drive, a magnetic tape drive, etc. The removable storage drive 714 reads from and/or writes to a removable storage unit 715 in a well known manner. Removable storage unit 715 represents an optical disk, magnetic tape, etc. which is read by and written to by removable storage drive 714. As will be appreciated, the removable storage unit 715 includes a computer usable storage medium having stored therein computer software and/or data.

In alternative embodiments, secondary memory 710 may include other similar devices for allowing computer programs or other instructions to be loaded into computing device 700. Such devices may include, for example, a removable storage unit 702 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 702 and interfaces 720, which allow software and data to be transferred from the removable storage unit 702 to computing device 700.

Computing device 700 may also include a communications interface 724. Communications interface 724 allows software and data to be transferred between computing device 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical or other signals capable of being received by communications interface 724. These signals 728 are provided to communications interface 724 via a communications path (e.g., channel) 726. This channel 726 carries signals 728 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 714, a hard disk installed in hard disk drive 712, and signals 728. These computer program products provide software to computing device 700. The invention is directed to such computer program products.

Computer programs (also referred to as computer control logic) are stored in main memory 708 and/or secondary memory 710. Computer programs may also be received via communications interface 724. Such computer programs, when executed, enable the computing device 700 to perform the features of the present invention, as discussed herein. In particular, the computer programs, when executed, enable the processor 704 to perform the features of the present invention. Accordingly, such computer programs represent controllers of the computing device 700.

In an embodiment where the invention is implemented using software, the software may be stored in a computer program product and loaded into computing device 700 using removable storage drive 714, hard disk drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for enabling control of insertions in a video, comprising:
   (a) receiving control data from a user input device, the control data specifying at least one of a modification, an activation and a deactivation of a visual element within the video, wherein the visual element tracks a display of a point of interest within the content of the video;
   (b) receiving video metadata describing a change in the point of interest; and
   (c) modifying an appearance of the visual element within the video as specified by the control data, wherein the visual element changes or moves with the video as specified by the video metadata determined in (b) to appear integrated with the video, wherein the control data specifies at least one of when and how the visual element is integrated in the displayed video.

2. The method of claim 1, and further comprising: (d) providing the video with the visual element inserted in (c) to a video display device for display to a user controlling the user input device, whereby the user controls how the visual element is integrated in the displayed video.

3. The method of claim 1, further comprising: (d) prior to the inserting of (c), selecting the visual element according to the control data, wherein the inserting (c) comprises inserting the visual element selected in (d).

4. The method of claim 3, further comprising: (e) retrieving the selected visual element from a source via a communication channel.

5. A method for enabling control of insertions in a video, comprising:
   (a) receiving control data from a user input device;
   (b) receiving video metadata describing a change in at least one point of interest in the content of the video; and
   (c) inserting a visual element into the video as specified by the control data, wherein the visual element changes or moves with the video as specified by the video metadata determined in (b) to appear integrated with the video, wherein the control data at least in part specifies when or how the visual element is integrated in the displayed video, wherein the receiving (a) comprises receiving control data that specifies an object in the foreground of the video, wherein the video metadata received in (b) comprises data describing the movement of the foreground object specified in the control data, and wherein the inserting (c) comprises inserting the visual element at a location in the video corresponding to the location of the specified foreground object in the video.

6. The method of claim 5, wherein the data describing the movement of the specified foreground object includes at least one of the group consisting of location data, velocity data, trail data, pose data, dimension data, and classification data.

7. The method of claim 5, wherein the analyzing (b) further comprises determining occlusion information describing an occlusion of the object specified in the control data, and wherein the inserting (c) comprises altering the visual element according to the occlusion information.

8. A method for enabling control of insertions in a video, comprising:
   (a) receiving control data from a user input device;
   (b) receiving video metadata describing a change in at least one point of interest in the content of the video; and
   (c) inserting a visual element into the video as specified by the control data, wherein the visual element changes or moves with the video as specified by the video metadata determined in (b) to appear integrated with the video, wherein the control data at least in part specifies when or how the visual element is integrated in the displayed video, wherein the analyzing (b) comprises determining a three-dimensional model corresponding to content of the video and further comprising: (d) rendering the visual element into a location in the three-dimensional model.

9. The method of claim 8, wherein the receiving (a) comprises receiving control data that specifies a position in the three-dimensional model, and wherein the rendering (d) comprises rendering the visual element to appear at the specified position in the three-dimensional model.

10. The method of claim 1, wherein the video is formatted as compressed video.

11. The method of claim 1, wherein the visual element is at least one of the group consisting of images, advertisements, text, video, and a rendered three dimensional object.

12. The method of claim 1, wherein the video is three-dimensional video.

13. A system for enabling control of insertions in a video, comprising:
   a user input processing module configured to receive control data from a user input device, the control data specifying at least one of a modification, an activation and a deactivation of a visual element within the video, wherein the visual element tracks a display of a point of interest within the content of the video;
   a video analysis module configured to receive video metadata describing a change in the at least one point of interest; and
   a mixer module configured to modify an appearance of the visual element within the video as specified by the control data, wherein the visual element changes or moves with the video as specified by the video metadata determined in (b) to appear integrated with the video, wherein the control data at least in part specifies when or how the visual element is integrated in the displayed video.

14. The system of claim 13, further comprising: a video display device configured to display the video with the visual element to the user controlling the user input device, whereby the user controls the visual element in the displayed video.

15. The system of claim 13, wherein the user input processing module comprises: a visual element selector module configured to select the visual element according to the control data, wherein the mixer module is configured to insert the selected visual element.

16. The system of claim 15, wherein the visual element selector module is configured to retrieve the selected visual element from a source via a communication channel.

17. A system for enabling control of insertions in a video, comprising:
   a user input processing module configured to receive control data from a user input device;
   a video analysis module configured to receive video metadata describing a change in at least one point of interest in the content of the video; and
   a mixer module configured to insert a visual element into a video as specified by the control data, wherein the visual element changes or moves with the video as specified by the video metadata determined in (b) to appear integrated with the video, wherein the control data at least in part specifies when or how the visual element is integrated in the displayed video, wherein the control data specifies an object in the foreground of the video, wherein the video metadata includes data describing movement of the foreground object specified in the control data, and wherein the mixer module is configured to insert the visual element at a location in the video corresponding to the location of the specified foreground object in the video.

18. The system of claim 17, wherein the data describing the movement of the specified foreground object includes at least one of the group consisting of location data, velocity data, trail data, pose data, dimension data, and classification data.

19. The system of claim 17, wherein the video analysis module is configured to determine occlusion information describing an occlusion of the object specified in the control data, and further comprising: a render module configured to alter the visual element according to the occlusion information.

20. A system for enabling control of insertions in a video, comprising:
   a user input processing module configured to receive control data from a user input device;
   a video analysis module configured to receive video metadata describing a change in at least one point of interest in the content of the video; and
   a mixer module configured to insert a visual element into a video as specified by the control data, wherein the visual element changes or moves with the video as specified by the video metadata determined in (b) to appear integrated with the video, wherein the control data at least in part specifies when or how the visual element is integrated in the displayed video, wherein the video analysis module is configured to determine a three-dimensional model corresponding to content of the video, and further comprising: a render module configured to alter the visual element into a location in the three-dimensional model.

21. The system of claim 20, wherein the receiving (a) comprises receiving control data that specifies a position in the three-dimensional model, and wherein the rendering (d) comprises rendering the visual element to appear at the specified position in the three-dimensional model.

22. The system of claim 13, wherein the video is formatted as compressed video.

23. The system of claim 13, wherein the video is three-dimensional video.

24. The system of claim 13, wherein the visual element is at least one of the group consisting of images, advertisements, text, video, and a rendered three dimensional object.

25. A set top box for enabling control of insertions in a video, comprising:
 a user input processing module configured to receive control data from a user input device, the control data specifying at least one of a modification, an activation and a deactivation of a visual element within the video, wherein the visual element tracks a display of a point of interest within the content of the video;
 a video analysis module configured to receive video metadata describing a change in the at least one point of interest; and
 a mixer module configured to modify an appearance of the visual element within the video as specified by to the control data, wherein the visual element changes or moves with the video as specified by the video metadata, wherein the control data at least in part specifies when or how the visual element is integrated in the displayed video.

26. A system for enabling control of insertions in a video, comprising:
 a web server configured to receive control data via a communication channel, the control data specifying at least one of a modification, an activation and a deactivation of a visual element within the video, wherein the visual element tracks a display of a point of interest within the content of the video; and
 a television distribution device coupled to the web server, comprising:
  a video analysis module configured to analyze movement of the at least one object in the video to determine video metadata describing a change in the at least one point of interest in the content of the video; and
  a mixer module configured to modify an appearance of the visual element within the video as specified by the control data, wherein the visual element changes or moves with the video as specified by the video metadata, wherein the control data at least in part specifies when or how the visual element is integrated in the displayed video.

27. A method for enabling control of insertions in a video, comprising:
 (a) receiving viewer data corresponding to a viewer of the video;
 (b) generating control data based on viewer data according to at least one rule defined by a user different from the viewer, the control data specifying at least one of a modification, an activation and a deactivation of a visual element within the video, wherein the visual element tracks a display of a point of interest within the content of the video;
 (c) receiving video metadata describing a change in the at least one point of interest;
 (d) modifying an appearance of the visual element within the video according to the control data, wherein the visual element changes or moves with the video as specified by the video metadata determined in (c) to appear integrated with the video; and
 (e) providing the video with the visual element inserted in (c) to a video display device for display to the viewer, whereby the at least one user-defined rule specifies how the visual element is integrated into the video displayed to the viewer.

28. The method of claim 27, wherein the viewer data includes at least one of the group consisting of a viewer location, a program time, viewer profile data and survey data.

29. The method of claim 27, wherein the viewer data indicates that the viewer has requested to fast forward through at least a portion of an advertisement in the video, further comprising: (f) selecting the visual element according to the advertisement.

30. A method for enabling control of insertions in a video, comprising:
 (a) receiving control data from a user input device, the control data specifying at least one of a modification, an activation and a deactivation of a visual element within the video, wherein the visual element tracks a display of a point of interest within the content of the video;
 (b) analyzing the video to determine video metadata describing a change in the at least one point of interest; and
 (c) modifying an appearance of the visual element within the video as specified by the control data, wherein the visual element changes or moves with the video as specified by the video metadata determined in (b) to appear integrated with the video, wherein the control data at least in part specifies when or how the visual element is integrated in the displayed video.

31. A method for enabling display of insertions in a video, comprising:
 (a) receiving control data from a user input device, the control data specifying at least one of a modification, an activation and a deactivation of a visual element within the video, wherein the visual element tracks a display of a point of interest within the content of the video;
 (b) receiving video metadata describing a change in the at least one point of interest;
 (c) combining the visual element with the clean feed video to create a dirty feed video, wherein the visual element changes or moves with the video as specified by the video metadata determined in (b) to appear integrated with the video;
 (d) selecting either the clean feed video or dirty feed video according to the control data; and
 (e) providing at least a portion of the video selected in (d) to a video display device for display to the user.

* * * * *